United States Patent [19]
Stine et al.

[11] Patent Number: 6,115,643
[45] Date of Patent: Sep. 5, 2000

[54] REAL-TIME MANUFACTURING PROCESS CONTROL MONITORING METHOD

[75] Inventors: Scott G. Stine, Boise; Michael Tiegs, Eagle, both of Id.

[73] Assignee: MCMS, Nampa, Id.

[21] Appl. No.: 09/018,076

[22] Filed: Feb. 3, 1998

[51] Int. Cl.⁷ .................................................. G06F 19/00
[52] U.S. Cl. ........................... 700/110; 700/32; 700/108; 700/109; 700/115; 714/51; 714/48; 714/704; 702/81; 702/83; 702/182; 702/185
[58] Field of Search ............................. 700/32, 104, 105, 700/108, 109, 110, 111, 115; 714/22, 48, 57, 704; 702/81–84, 182–185

[56] References Cited

U.S. PATENT DOCUMENTS

| | | | |
|---|---|---|---|
| 4,769,761 | 9/1988 | Downes et al. | 709/224 |
| 5,054,097 | 10/1991 | Flinois et al. | 382/44 |
| 5,155,842 | 10/1992 | Rubin | 714/22 |
| 5,191,534 | 3/1993 | Orr et al. | 700/105 |
| 5,442,562 | 8/1995 | Hopkins et al. | 700/108 |
| 5,708,775 | 1/1998 | Nakamura | 714/48 |
| 5,740,357 | 4/1998 | Gardiner et al. | 714/57 |
| 5,748,884 | 5/1998 | Royce et al. | 714/57 |
| 5,750,908 | 5/1998 | Drohan | 700/108 |
| 5,822,208 | 10/1998 | Bory | 700/108 |
| 5,835,898 | 11/1998 | Brog et al. | 700/83 |
| 5,844,803 | 12/1998 | Beffa | 700/108 |
| 5,859,964 | 1/1999 | Wang et al. | 714/48 |
| 5,862,054 | 1/1999 | Li | 700/108 |
| 5,862,145 | 1/1999 | Grossman et al. | 714/704 |
| 5,884,101 | 3/1999 | Wu | 710/57 |
| 5,905,650 | 5/1999 | Tsutsui et al. | 700/109 |
| 5,923,840 | 7/1999 | Desnoyers et al. | 714/48 |
| 5,940,300 | 8/1999 | Ozaki | 700/109 |
| 5,943,237 | 8/1999 | Van Boxem | 700/108 |

*Primary Examiner*—Paul P. Gordon
*Assistant Examiner*—Ramesh Patel
*Attorney, Agent, or Firm*—Knobbe, Martens, Olson & Bear, LLP

[57] ABSTRACT

A method of identifying unacceptable levels of defects in specific sections or work centers of a manufacturing process on a real time basis and initiating corrective action is disclosed. The system allows a user to define defect tolerances or thresholds for manufacturing work centers, tracks defects at the work centers, compares the level of faults with the tolerances, reports out of tolerance work centers, automatically initiates contact with the appropriate personnel to affect a correction to the out of tolerance work center, and maintains records of corrective actions taken.

16 Claims, 11 Drawing Sheets

FIG. 6

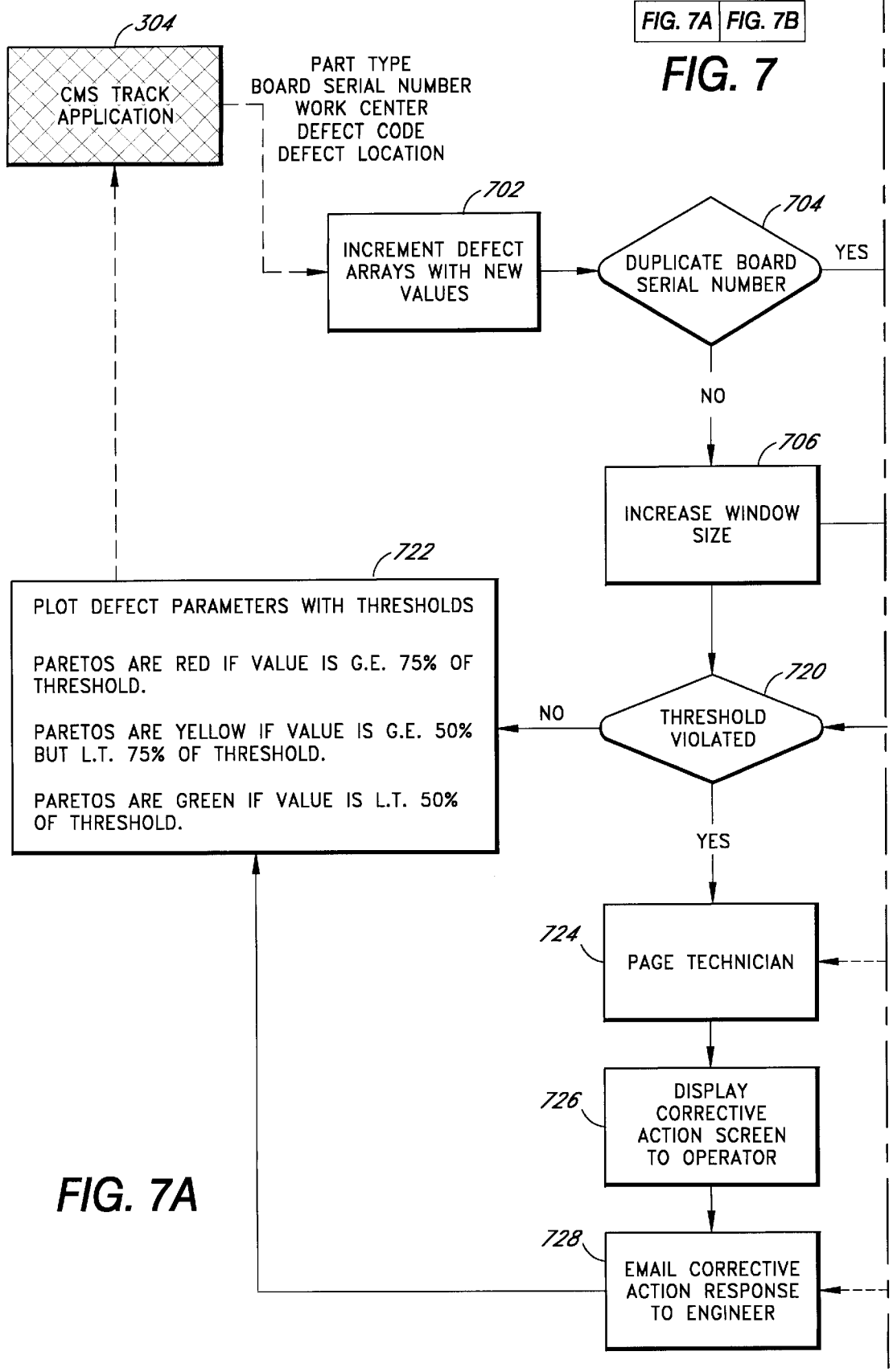

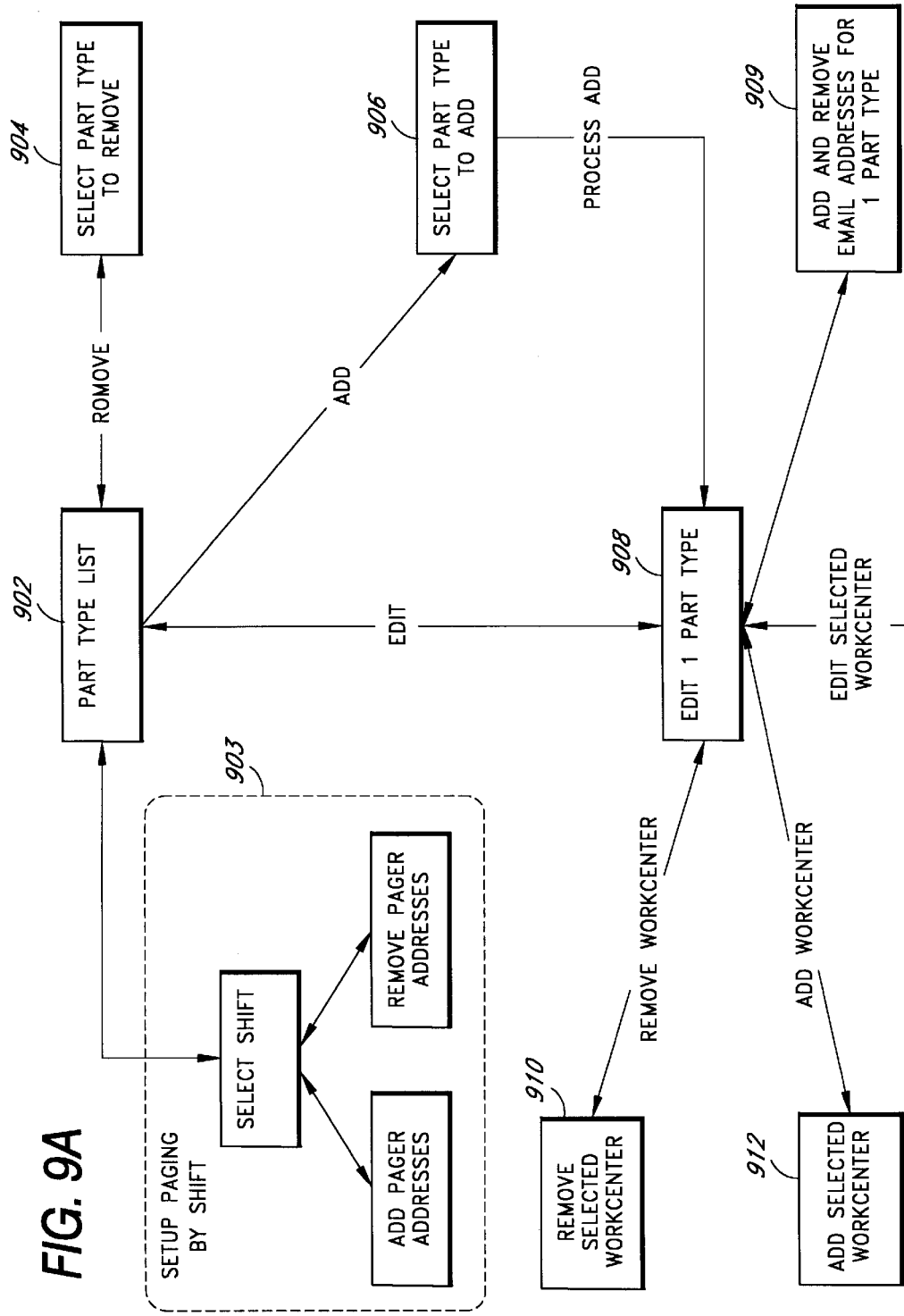

REAL-TIME MANUFACTURING PROCESS CONTROL MONITORING METHOD

CROSS-REFERENCE TO RELATED APPLICATIONS

The following patent application is cross-referenced as a related application, and has been assigned to Micron Electronics, Incorporated. This application has been concurrently filed and is hereby incorporated in this patent application by reference.

| U.S. patent application Ser. No. | Title |
|---|---|
| 09/018,083 | Real-Time Manufacturing Process Control Monitoring Apparatus |

FIELD OF THE INVENTION

The invention relates to systems for monitoring manufacturing processes and, more particularly, to such systems which monitor manufacturing defects.

BACKGROUND OF THE INVENTION

There are many known systems for monitoring manufacturing processes. Such systems are typically computerized and vary in their level of integration into the manufacturing process. Some systems provide the capability to monitor the number of parts produced and defects or faults which are then reported by part. This information has proven useful in evaluating and improving or controlling manufacturing processes.

However, known systems do not offer an automated way to identify unacceptable levels of defects in specific sections or stations of the manufacturing process on a real time basis and to initiate corrective action. For example, in currently known systems, if a particular manufacturing machine is out of tolerance and generates an extremely high rate of defective parts, current manufacturing tracking systems merely record the number of defective parts and may have software that can be utilized to generate statistical reports. However, the systems do not automatically indicate that there is a problem at a particular station nor do the systems automatically alert the proper personnel to address the out of tolerance machine, suggest corrections, or record corrective actions taken.

For example, a manufacturing machine such as a "pick and place" which is used to install integrated circuit "chips" on circuit boards may be in need of adjustment. Certain misadjustments can cause the machine to repeatedly misalign the chips with the board resulting in defective parts. Currently defect tracking systems log and store defect data but do not provide the operators of the machines with information about acceptable or unacceptable defect rates for that step in the manufacturing process. Rather than alerting an operator to the fact that an excessive number of defects are occurring, current systems merely store the data which is then later analyzed and acted upon. This can result in entire product runs having excessively high defect rates.

SUMMARY OF THE INVENTION

The invention is directed to a system and method capable of identifying unacceptable levels of defects in specific sections or work centers of a manufacturing process on a real time basis and initiating corrective action. In one aspect of the invention, the system allows a user to define defect tolerances or thresholds for manufacturing work centers. The system then tracks defects at the work centers, compares the level of faults with the tolerances, reports out of tolerance work centers, automatically initiates contact with the appropriate personnel to affect a correction to the out of tolerance work center, and maintains records of corrective actions taken.

A fuller understanding of the features and benefits of the present invention will become more fully apparent from the following description taken in conjunction with the accompanying drawings, in which like numerals refer to like parts.

BRIEF DESCRIPTION OF THE DRAWINGS

FIG. 6 depicts a graphical interface related to information about products that pass or fail product tests;

DETAILED DESCRIPTION OF THE INVENTION

Figure 1:
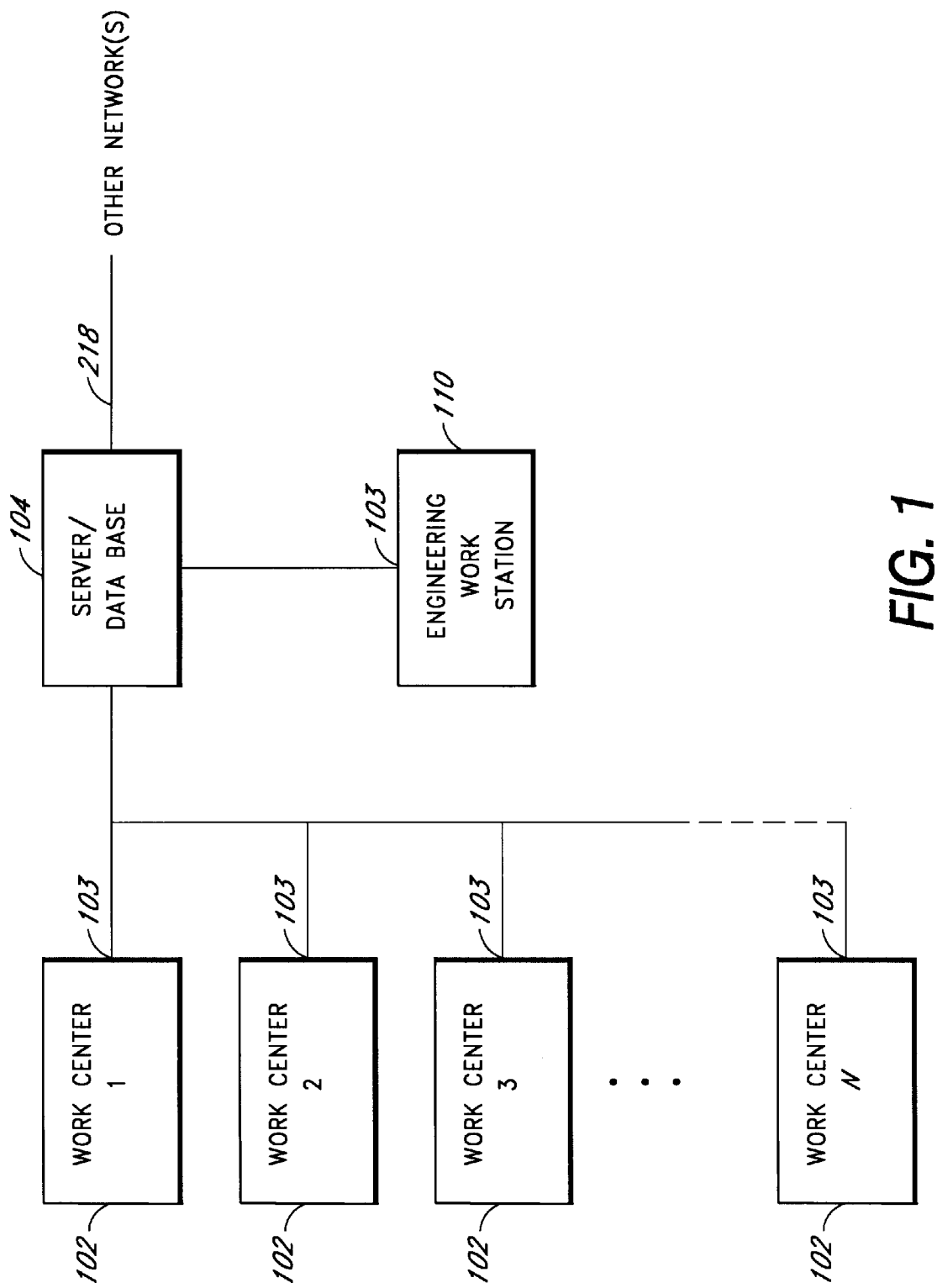
FIG. 1 is a block diagram of a manufacturing monitoring system in which embodiments of the invention can be employed.

The invention is directed to a system and method which in different aspects of various embodiments allows a user to define defect tolerances for manufacturing work centers, tracks defects at the work centers, compares the level of faults with the tolerances, reports out of tolerance work centers, automatically initiates contact with the appropriate personnel to affect a correction to the out of tolerance work center, and maintains records of any corrective actions taken. The system and method can be implemented in software in a distributed network system such as is depicted in FIG. 1. The software can be stored on any appropriate program storage device, including, for example, floppy disks, compact laser discs, and random access memory.

Referring to FIG. 1, a block diagram of a manufacturing computer system in which the invention can be utilized is shown. Such a system may incorporate numerous work centers 102 which represent manufacturing stations and/or test stations and/or quality assurance stations. Typically, the work centers 102 include a computer, such as a personal computer ("PC") which is linked to a network through a network connection 103.

The server 104 for the network to which the work centers 102 are connected can be any of the numerous types of network servers known to those of ordinary skill in the art. The particular network server employed is chosen depending upon the performance requirements of the specific system using criteria such as the number of work centers on the network, and the amount of data to be distributed and stored. The server 104 also stores a database which will be described further with regard to FIG. 2. The server 104 can also provide access to other networks such as those typically utilized by accounting and/or marketing departments which may exchange data with the manufacturing network. It is also possible that a single network can serve all of the departments of a small manufacturing facility.

An engineering work station 110 is also connected by a network connection 103 to the network served by server 104. More than one engineering work station may be employed depending on the requirements of the users. Engineering work stations may be used to analyze the manufacturing process and for other purposes as will be described below in further detail. The engineering work station includes a PC or mini-computer such as a SPARC work station. Both the computers at the work center 102 and the engineering work station 110 may run a windows-based operating system allowing for easy user interface. However, other user interface systems, including custom systems can be employed.

Figure 2:
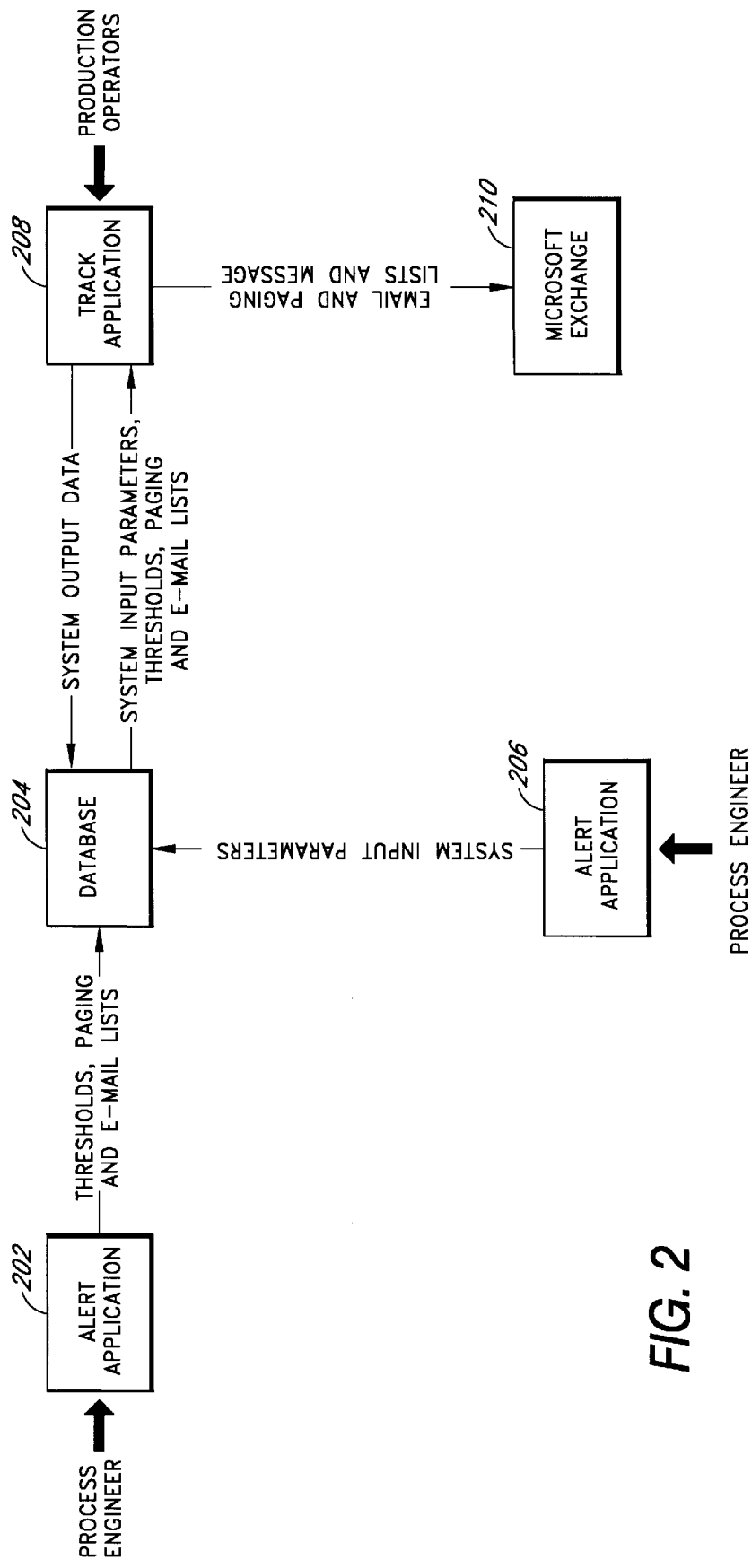
FIG. 2 is a block diagram of components of an embodiment of the invention.

Referring now to FIG. 2, a high level block diagram of the components of a manufacturing process tracking system according to the principles of the present invention is shown. The components can be implemented as software or firmware applications operating in cooperation with hardware components as is known to those of ordinary skill. The components depicted in FIG. 2 may operate on the computer system depicted in FIG. 1. The Alert application 202 provides an interface, such as a graphical user interface which can be displayed at the engineering work center 110 (FIG. 1). The Alert application 202 allows process engineers to set manufacturing defect thresholds, to provide the names of the technicians that will be paged when the thresholds for specific work stations are exceeded and to identify to whom e-mails will be sent containing indications that thresholds have been exceeded and what corrective actions were taken. That information may be stored in a system database 204 which may be maintained in the server 104 of FIG. 1.

A system parameter setup application 206 may also be provided. Generally speaking, a system parameter setup application provides an interface for the process engineer to input the parameters for the tracking system such as the types of possible defects (e.g., low solder volume, misplaced components), the identification of the various work centers 102 in FIG. 1, and other systems setup information. That information may also be maintained in the database 204. Such applications are usually provided as part of manufacturing defect tracking systems known to those of ordinary skill in the art. Therefore, the details of this application will not be provided herein as they are commercially available and known to those of skill in the art.

The Track application 208 provides a user interface and receives input from the production operators at the work centers 102 (FIG. 1) relating to defects. The track application 208 transfers defect information to the database 204 where it is maintained. In addition, the track application determines when defect thresholds have been exceeded and takes appropriate actions in response thereto including initiating the paging of technicians and the sending of e-mails to the appropriate individuals as was defined by the Alert application 202. The e-mail and paging functions are carried out, in one embodiment, utilizing the Exchange software 210 from Microsoft Corporation.

Figure 3:
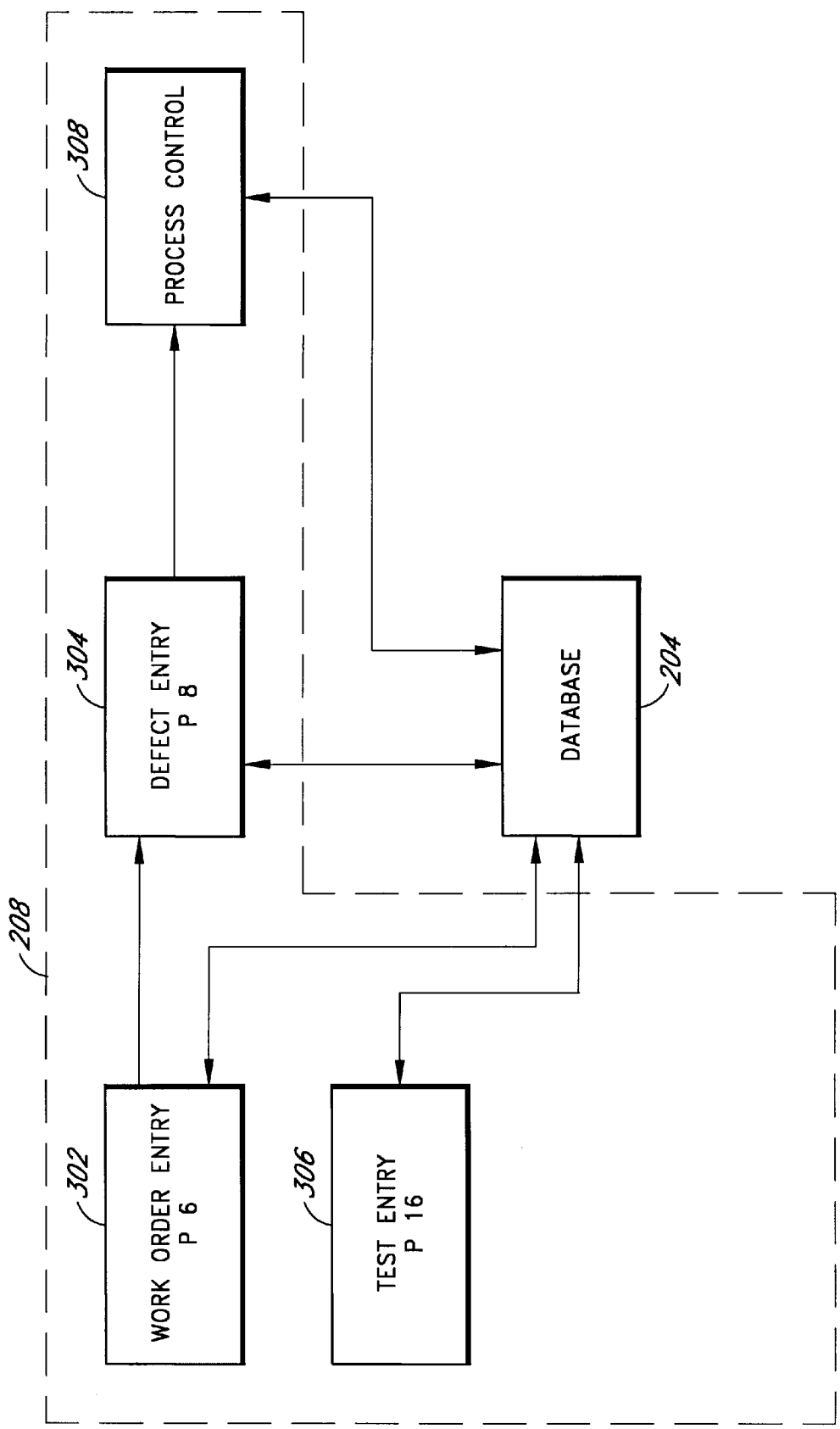
FIG. 3 is a block diagram illustrating data flow between components of an embodiment of the invention.

Turning now to FIG. 3, a more detailed description of the track application 208 of the system will be provided. In FIG. 3, track application 208 is shown to include six software modules. Each of the modules will be described in turn. Of course, the functions of the modules of the Track application 208 can be divided into a different number of modules or combined into a single module.

Figure 4:
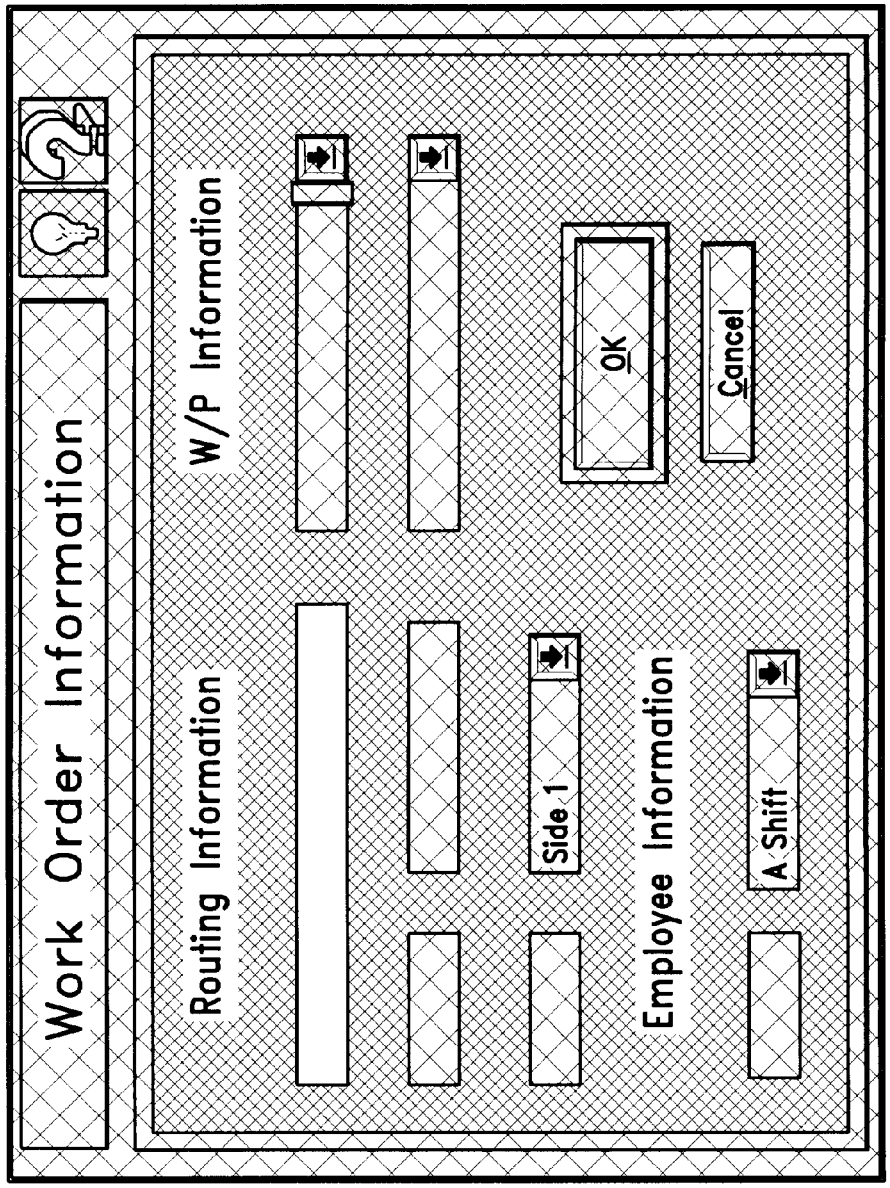
FIG. 4 depicts a graphical interface related to work order information.

The work order entry module 302 provides a user interface to the operator at a work station 102 of FIG. 1 and prompts the operator to enter data relating to a work order. An example of a user interface which can be displayed on the screen of a monitor at the work center 102 is shown in FIG. 4. That graphical user interface, in one embodiment, prompts the operator to enter work order information. Such information received by the order entry module may be, for example, part type, customer codes work order ID, quantity, the employee's number and shift, the work center and the operation that is being performed at the work station. Alternatively, the foregoing information could be automatically generated or retrieved from an automated manufacturing station. The information work order information is then stored in database 204. After entering the information, control can be transferred to the defect entry module 304.

The defect entry module 304 provides a graphical user interface to prompt the operator to enter data relating to a specific part and defect within a work order. In other words, the work order entry module 302 is used to receive information relating to an entire work order while the defect entry module 304 receives data for individual parts within a work order.

Figure 5:
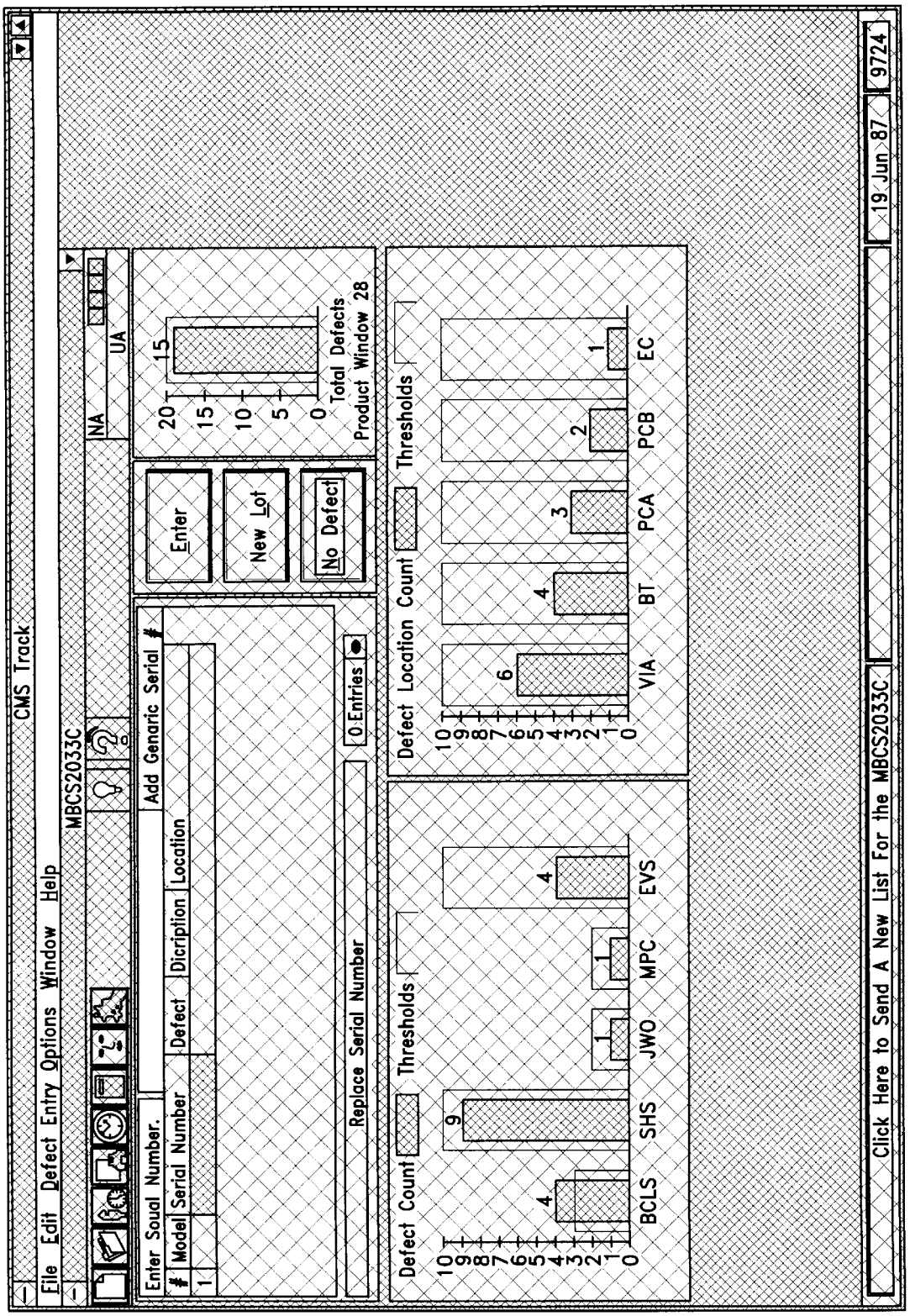
FIG. 5 depicts a graphical interface related to defect related information.

An example of a graphical user interface which can be displayed on the screen of the monitor at the work center 102 (FIG. 1) is shown in FIG. 5. The graphical user interface shown in FIG. 5 is generated by the defect entry module 304 to prompt the user to enter defect related information for a specific part. For example, the user may be prompted to enter the serial number of the part, a code or description of the defect and the disposition of the part with the defect. In addition, the graphical user interface can display totals or counts for selected defects or reject codes for the current order being processed. The threshold or maximum number of defects permitted can also be shown. In addition, this graphical user interface can also display the defect count by defect location. This would be applicable where a specific location on the part may have more than one defect that could be associated with it but the threshold of permissible defects per order can be set in terms of defects per location and not just total defects by type of defect.

Shown in the upper right quadrant of the graphical user interface shown in FIG. 5 is a bar chart representing the total defects for the work order. Defect limits can be set by defect or fault code, total defects, and defects by location. The process that is initiated when any of the thresholds is exceeded is describable with reference to FIG. 7. The test entry module 306 provides a graphical user interface for entering and for transmitting that data to the database 204.

Figure 6:
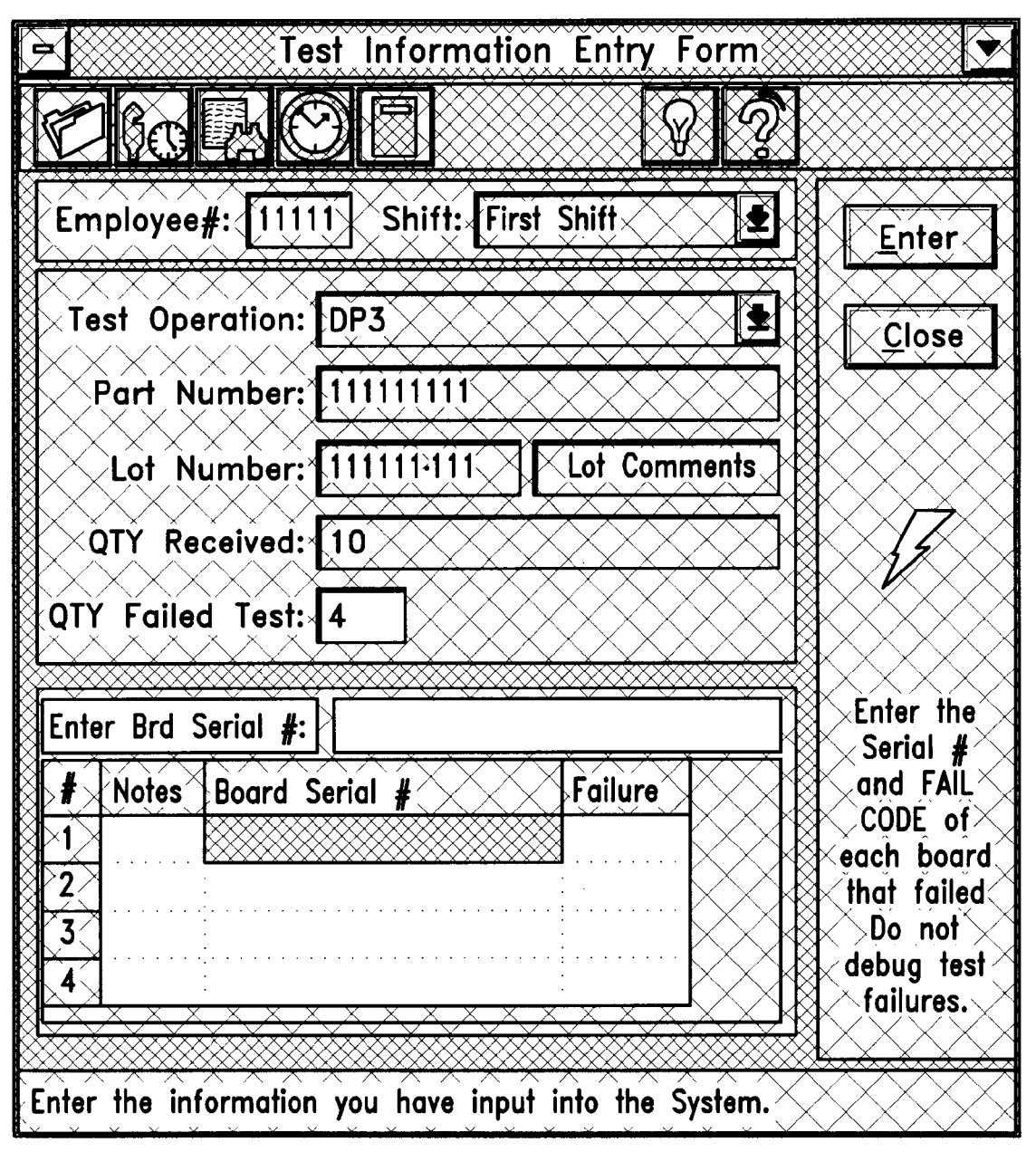

An example of a graphical user interface which can be displayed on the screen on a monitor at a work center 102 (FIG. 1) is shown in FIG. 6. As shown in FIG. 6, the graphical user interface displayed by the test entry module 306 prompts the operator to enter an employee number, a shift number, the test operation and part number. The operator can then enter the quantity from the present lot that failed the identified test. Each part that failed the test is identified by serial number. This information is then transmitted by the test entry module to the database. The information stored in the database is used by the defect entry module 304, discussed above, to determine defect counts, defect location counts, and total defect counts.

The process control module 308 maintains defect counts, determines whether defect count thresholds have been exceeded and initiates the notification procedures when the defect thresholds have been exceeded. As indicated in FIG. 3, the process control module communicates with the defect entry module 304 and database 204. A more detailed description of the process control module can now be provided with reference to FIG. 7.

Figure 7B:
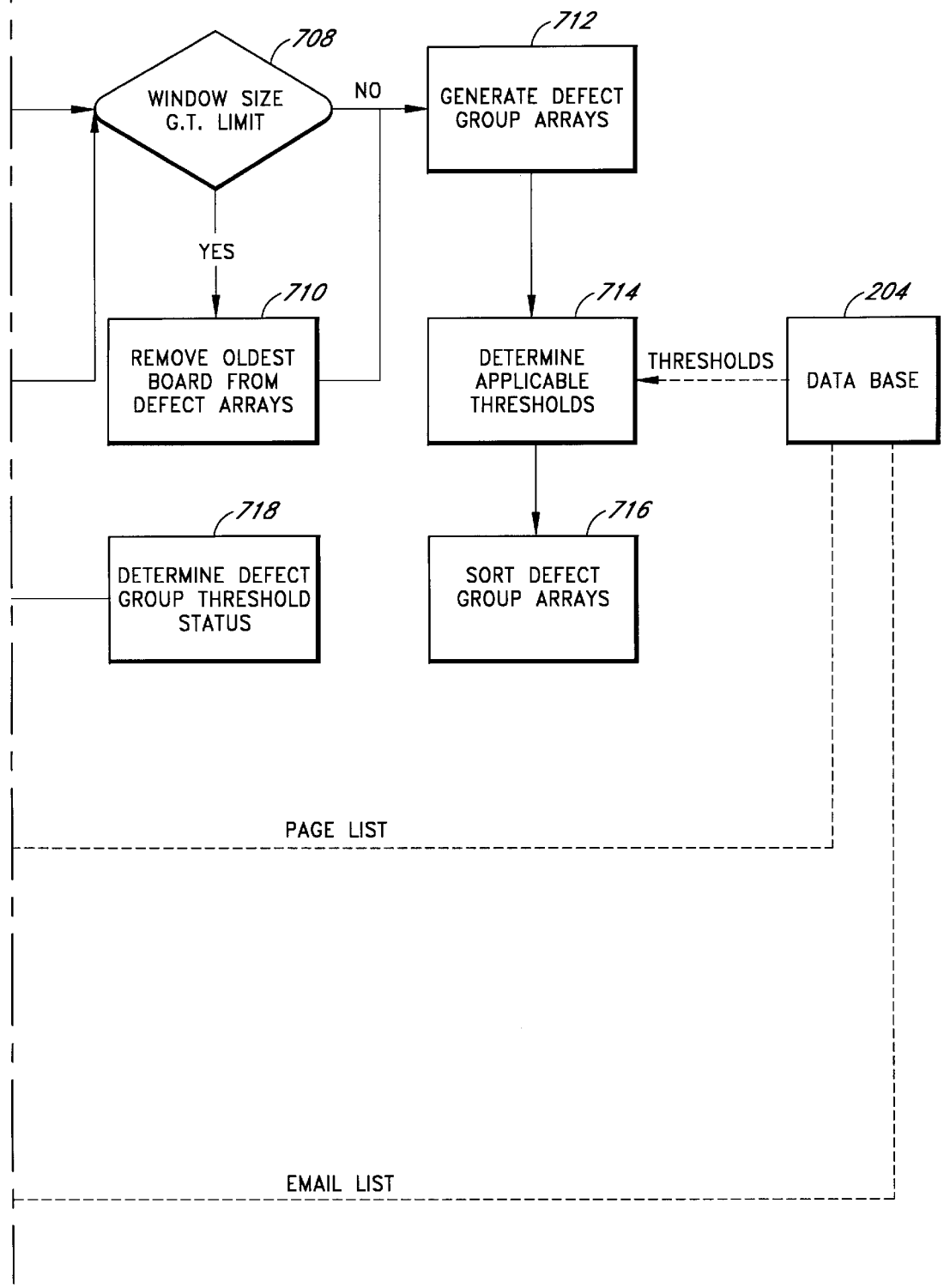
FIG. 7 is a flow chart which defines functions performed by the process control module.

FIG. 7 is a flow chart which represents the functions carried out by the process control module 308. At step 702 data received by the defect entry module as input from an operator in response to the graphical user interface depicted in FIG. 5, is utilized by the process control module to increment the defect arrays or counts with new values. The defect information from the defect entry module may be stored in database 204 and accessed by the process control module 308 or, alternatively, it can be transferred from the defect entry module 304 to the process control module 308. The defect arrays correspond to the various defect counts maintained in database 204 and displayed on the graphical user interface depicted in FIG. 5. The defect arrays can include counts by defect code, defect location, and total defects by part type.

Next, at Step 704 the process control module determines whether the serial number for the board or part is a duplicate. Typically, a serial number would be a duplicate in a situation where a second or additional defect has been entered in a system for the same part. If the serial number is not a duplicate, the window size of the graphical user interface depicted in FIG. 5 is increased so that the additional part number can be displayed as indicated in Step 706. At Step 708, the process control module determines whether the window size of the portion of the window displaying the serial numbers of the defective parts at the work station exceeds the maximum size permissible for the window. If the maximum size is exceeded, the oldest serial number is removed from the defect arrays for that work center, as indicated as Step 710. In this manner, the definition of the window size can be used to define the size of the set upon which the defect thresholds are based. In other words, if the window size, for example, is set to a maximum of listing 20 parts, then the defect thresholds would be set based upon a group of 20.

Next, at Step 712, the process control module increments the defect group arrays. These arrays are the current count of defects (for example, by part number, by location, by defect code) for the work center. Next, at Step 714, the process control module determines the applicable thresholds for the defect arrays. The thresholds may be stored and retrieved from database 204. Next, at Step 716, the defect group arrays may be sorted to display the arrays in order according to which is closer to its threshold. Then, at Step 718, the defect count or arrays are compared against the thresholds to determine if any of the thresholds have been exceeded. As indicated at Step 720, if none of the thresholds have been exceeded, the information for graphically displaying the status for each of the defect arrays is determined at Step 722.

An example of a manner of displaying the defect counts is shown in FIG. 5. As an example, if the defect count is greater than 75% of the threshold value, the graphical representation can be in red in order to alert the operator that the defect threshold is close to being violated. If the defect count is between 50% and 75% of the threshold, the graphical representation can be presented in yellow. Finally, the graphical representation can be presented in green if the defect count is less than 50% of the threshold value.

Figure 8:
FIG. 8 depicts a graphical interface related to corrective actions.

Returning to Step 720 of FIG. 7, if a threshold has been exceeded, then at Step 724 the process control module initiates the actions to page the technician responsible for the particular work center. The pager information (e.g., pager number) for the technician responsible for the work center can be stored in the database 204. Next, in Step 726, the process control module displays a corrective action screen, in the form of a graphical user interface, to the operator at the work center Such a graphical user interface is depicted in FIG. 8. The corrective action screen can display the name of the technician being paged, the threshold that has been exceeded, and other relevant information. The corrective action screen can also request the operator to enter the root cause of the defect which exceeded the threshold and a description of the corrective action taken at the work center to address the problem. In addition, it is possible to display suggested corrective actions or a course of action to be followed by the operator to attempt to determine if there is a fault at the work center which is causing an excessive number of defects.

At Step 728, the information entered in response to the corrective action screen is sent by e-mail to an engineer and/or other parties to review and analyze. The list of e-mail recipients can be stored in the database 204. Next, the process control module proceeds to Step 722 to display the defect parameters as described above.

The foregoing process described with reference to FIG. 7 is carried out each time a defect is entered by the defect entry module 304.

Figure 9B:
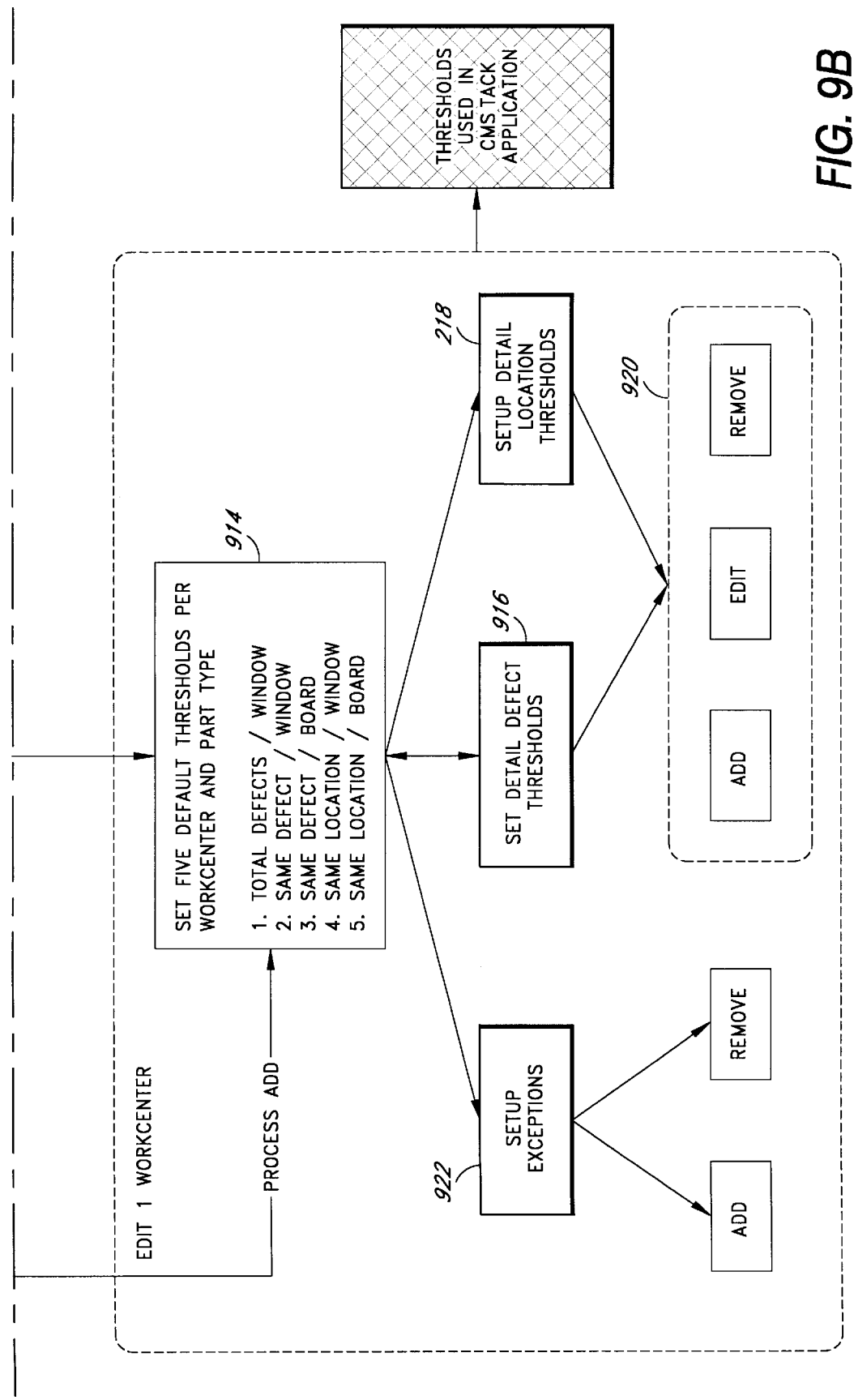
FIG. 9 is a flow chart depicting aspects of the operation of the Alert application.

The Alert application 202 shown in FIG. 2, functions to establish the defect thresholds for work centers. The Alert application 202 also generates the e-mail lists and paging lists which are utilized when a threshold is exceeded. Referring to FIG. 9, a description of the operation of the Alert application will be provided. FIG. 9 is a functional flow chart representing the functions carried out by the Alert application 202. Generally speaking, the functions performed by the Alert application can be divided into two groups, functions relating to part types and functions relating to work centers. The functions relating to part types will be described first.

The Alert application maintains a part list 902 in database 204 (see FIG. 2). The Alert application includes the functionality of removing items from the part list as represented by box 904. That function can be accomplished by a graphical user interface allowing a user to interactively delete part types from the part type list. In addition, an add function 906 allows for the addition of new part types to the part type list. That function can also be carried out through a graphical user interface, allowing a user to interactively add part types. Part types can be added from an available parts type list or a completely new part type can be added.

In a similar manner the Alert application can also provide the capability to add, delete or edit the pager list maintained in data base 204 as represented by box 901.

Information associated with each part type in a part type list can be edited utilizing the edit function 908. Associated with each part type may be a list of work centers at which those parts are manufactured or tested and an e-mail list of individuals to be notified when defect thresholds are exceeded for that part type. Associated with each work center by part type is defect threshold information. Therefore, work centers can be removed from association with a part type as indicated by process 910, or can be added in association with a part type as represented by process 912. In addition, e-mail addresses can be added or removed from association with a part type.

When a work center is added to a part type, defect information can then be associated with the work center for that part type. As represented at box 914, defect thresholds for a part type at a specific work center can be set for total defects, defect code or type, and defect by location. In addition, the defect code and defect by location thresholds can be set based upon defects per window (window defines a specific number of parts) or defects per board or defects per location on a board. Thresholds can be entered into the database by defect code ("detail") 916 and/or by location on the product 918. In addition, functionality is provided for adding, editing and removing each of these types of thresholds as represented by box 920. In addition, the functionality for setting up exception conditions 922 for each of the thresholds is provided. This would permit the thresholds to be ignored in selected circumstances.

As indicated by the foregoing description, various embodiments of the invention provide a system and method which can automatically indicate that there is a problem at a particular work center, automatically alert the proper personnel to address the problem, suggest corrections, and/or record corrective actions taken. Such systems and methods can increase manufacturing efficiency, reduce down time and thereby reduce manufacturing costs.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A computerized method capable of identifying unacceptable levels of defects in work centers of a manufacturing process on a real time basis and initiating corrective action utilizing a plurality of interconnected, computerized work centers, comprising:

storing thresholds for each of a plurality of defects in a database;

receiving data indicating the occurrence at a monitored area of at least one of the defects;

maintaining a count of the occurrences of said at least one of the defects;

comparing the count of the occurrences of the defects with the stored defect thresholds; and generating an indication when the count of the occurrences of the defects exceeds a stored defect threshold.

2. The method of claim 1, further including generating a graphical user interface to prompt a user at a work center to enter data indicating the occurrence of a defect.

3. A computerized method capable of identifying unacceptable levels of defects in work centers of a manufacturing process on a real time basis and initiating corrective action utilizing a plurality of interconnected, computerized work centers, comprising:

storing thresholds for each of a plurality of defects in a database;

receiving data indicating the occurrence at a monitored area of at least one of the defects;

maintaining a count of the occurrences of said at least one of the defects;

comparing the count of the occurrences of the defects with the stored defect thresholds; and generating an indication when the count of the occurrences of the defects exceeds a stored defect threshold, wherein generating an indication includes automatically notifying predetermined personnel that a predetermined tolerance has been exceeded.

4. The method of claim 3, wherein automatically notifying includes sending an e-mail message to predetermined personnel.

5. The method of claim 3, wherein automatically notifying includes paging predetermined personnel.

6. A method of monitoring defects levels during a manufacturing process, comprising:

tracking manufacturing defects at selected locations;

comparing the level of defects occurring at the locations with predetermined tolerances; and generating an indication when the level of defects at a location exceeds the predetermined tolerance, wherein the act of generating an indication includes automatically notifying predetermined personnel that a predetermined tolerance has been exceeded.

7. The method of claim 6, wherein the act of automatically notifying includes sending an e-mail message to predetermined personnel.

8. The method of claim 6, wherein the act of automatically notifying includes paging predetermined personnel.

9. The method of claim 6, further comprising maintaining records in a data base of any corrective actions taken in response to the notification.

10. The method of claim 6, additionally comprising creating a data base of tolerances for defects.

11. The method of claim 10, additionally comprising maintaining counts of defects.

12. A method of monitoring and responding to defects detected during a manufacturing process that includes a plurality of interconnected, computerized work centers, comprising:

storing a threshold for a defect in a database;

receiving data indicating the occurrence of the defect at a work center;

maintaining a count of the occurrences of the defect at the work center;

comparing the count of the occurrences of the defect with the stored defect threshold; and automatically notifying predetermined personnel that the stored defect threshold has been exceeded when the count of the occurrences of the defect exceeds the stored defect threshold.

13. The method of claim 12, further including generating a graphical indication at the work center that the stored defect threshold has been exceeded.

14. The method of claim 12, additionally comprising maintaining records in a data base of any corrective actions taken in response to the notification.

15. A method of monitoring and responding to defects detected during a manufacturing process that includes a plurality of interconnected, computerized work centers, comprising:

storing a threshold for a defect in a database;

receiving data indicating the occurrence of the defect at a work center;

maintaining a count of the occurrences of the defect at the work center;

comparing the count of the occurrences of the defect with the stored defect thresholds; and automatically notifying predetermined personnel that the stored defect threshold has been exceeded when the count of the occurrences of the defect exceeds the stored defect threshold, wherein automatically notifying includes sending an e-mail message to at least one predetermined recipient.

16. A method of monitoring and responding to defects detected during a manufacturing process that includes a plurality of interconnected, computerized work centers, comprising:

storing a threshold for a defect in a database;

receiving data indicating the occurrence of the defect at a work center;

maintaining a count of the occurrences of the defect at the work center;

comparing the count of the occurrences of the defect with the stored defect thresholds; and automatically notifying predetermined personnel that the stored defect threshold has been exceeded when the count of the occurrences of the defect exceeds the stored defect threshold, wherein automatically notifying includes paging at least one predetermined recipient.

* * * * *